(12) United States Patent
Klingler et al.

(10) Patent No.: US 10,264,355 B2
(45) Date of Patent: Apr. 16, 2019

(54) LOUDSPEAKER CABINET WITH THERMAL AND POWER MITIGATION CONTROL EFFORT

(71) Applicant: Apple Inc., Cupertino, CA (US)

(72) Inventors: Daniel C. Klingler, Mountain View, CA (US); Afrooz Family, Emerald Hills, CA (US); Brandon J. Rice, Pacifica, CA (US); James M. Hollabaugh, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/613,107

(22) Filed: Jun. 2, 2017

(65) Prior Publication Data

US 2018/0352329 A1    Dec. 6, 2018

(51) Int. Cl.
| | |
|---|---|
| *H04R 3/00* | (2006.01) |
| *G06F 1/20* | (2006.01) |
| *H04R 29/00* | (2006.01) |
| *H04R 3/04* | (2006.01) |
| *H04R 1/28* | (2006.01) |

(52) U.S. Cl.
CPC ............. *H04R 3/007* (2013.01); *G06F 1/206* (2013.01); *H04R 1/2811* (2013.01); *H04R 1/2888* (2013.01); *H04R 3/04* (2013.01); *H04R 29/001* (2013.01)

(58) Field of Classification Search
CPC .... H04R 3/007; H04R 1/2811; H04R 1/2888; H04R 3/04; H04R 29/001; G06F 1/206
USPC ................................ 381/55, 59, 96, 189, 394
See application file for complete search history.

(56) References Cited

U.S. PATENT DOCUMENTS

| | | | |
|---|---|---|---|
| 6,865,274 B1 | 3/2005 | Aarts et al. | |
| 6,931,135 B1 | 8/2005 | Kohut | |
| 7,447,318 B2 | 11/2008 | Button et al. | |
| 8,385,564 B2* | 2/2013 | Pfaffinger | H03F 1/30 |
| | | | 330/256 |
| 8,983,080 B2 | 3/2015 | Luo et al. | |
| 9,131,302 B2 | 9/2015 | Williams et al. | |
| 9,614,489 B2* | 4/2017 | Cheng | H03G 9/025 |
| 2005/0195982 A1* | 9/2005 | Olive | H04R 29/00 |
| | | | 381/59 |

(Continued)

FOREIGN PATENT DOCUMENTS

WO    WO-2016124897    8/2016

*Primary Examiner* — Paul Kim
*Assistant Examiner* — Friedrich Fahnert
(74) *Attorney, Agent, or Firm* — Womble Bond Dickinson (US) LLP

(57) ABSTRACT

An operating power level for a loudspeaker cabinet and a target power level for the loudspeaker cabinet are determined during output of an audio signal by the loudspeaker cabinet. The target power level is based on temperature data for the loudspeaker cabinet and varies as the temperature data changes. Based on the operating power level and the target power level, values of two or more control parameters for controlling audio output of the loudspeaker cabinet are generated, where at least one of the control parameters controls the gain of a specific audio frequency band. The audio signal is adjusted according to the generated values of the control parameters, where doing so reduces power consumption of the loudspeaker cabinet during the audio output. Other embodiments are also described.

24 Claims, 8 Drawing Sheets

(56) References Cited

U.S. PATENT DOCUMENTS

| | | | |
|---|---|---|---|
| 2008/0056504 A1* | 3/2008 | Gorges | H03G 7/007 381/55 |
| 2014/0254805 A1* | 9/2014 | Su | H04R 3/007 381/55 |
| 2014/0365793 A1* | 12/2014 | Cox | G06F 1/206 713/320 |
| 2015/0215704 A1* | 7/2015 | Magrath | H04R 9/022 381/55 |
| 2016/0241960 A1* | 8/2016 | Cheng | H04R 29/001 |
| 2017/0006394 A1* | 1/2017 | Risberg | H04R 3/002 |
| 2017/0011748 A1 | 1/2017 | Porter et al. | |
| 2017/0094408 A1* | 3/2017 | Napoli | H03G 3/001 |
| 2017/0150259 A1* | 5/2017 | Gautama | H03G 7/002 |
| 2018/0014120 A1* | 1/2018 | Lawrence | H04R 3/007 |
| 2018/0014121 A1* | 1/2018 | Lawrence | H04R 3/007 |

\* cited by examiner

185

| Control Effort 210 | Control Param 215 | Control Param 220 | Control Param 225 | ... | Control Param 230 |
|---|---|---|---|---|---|
| 0 | Value 1 | Value 1 | Value 1 | ... | Value 1 |
| 0.1 | Value 2 | Value 2 | Value 2 | ... | Value 2 |
| 0.2 | Value 3 | Value 3 | Value 3 | ... | Value 3 |
| . . . | . . . | . . . | . . . | . . . | . . . |
| 1 | Value N | Value N | Value N | ... | Value N |

FIG. 2

LOUDSPEAKER CABINET WITH THERMAL AND POWER MITIGATION CONTROL EFFORT

FIELD

An embodiment of the invention relates to a loudspeaker that dynamically adjusts output of its audio signal, for thermal and power mitigation.

BACKGROUND

Loudspeakers, particularly wireless speakers, are becoming more prevalent inside and outside of users' homes. These speakers may wirelessly pair with audio sources (e.g., a desktop computer, laptop, tablet, or smartphone) over a computer network (e.g., peer-to-peer (P2P) distributed wireless computer network, or local area network), using BLUETOOTH links or WIFI links, and perform rendering and playback (output) of audio signals that are wireless received from the audio sources. In addition, several wireless speakers may communicate with each other to form a wireless audio system that provides users with the flexibility to project sound at nearly any location, within transmission range of a radio frequency (RF) transmitter unit of the audio source.

SUMMARY

Audio rendering and output by a wireless loudspeaker cabinet may be a primary source of heat inside the cabinet, and depending on the placement of the cabinet and its output volume, could lead to overheating of the cabinet, thereby reducing its lifespan and performance. An embodiment of the invention is a method, performed by a programmed digital processor, for operating a loudspeaker cabinet with thermal and power mitigation in order to reduce temperature of the cabinet. The method determines an operating power level for the loudspeaker cabinet and a target power level for the loudspeaker cabinet, during output (playback) of an audio signal by the loudspeaker cabinet. The operating power level may be based on a measurement of power consumed by the electronics within the loudspeaker cabinet, and is therefore continually changing during operation of the loudspeaker cabinet. The target power level may be determined by performing an algorithm, e.g., using a predetermined look up table, based on temperature data for the loudspeaker cabinet, where the target power level varies as the temperature data changes (the loudspeaker cabinet heats up and cools down.) Based on the present operating power level and the present target power level, the method generates updated values of control parameters for controlling audio output of the loudspeaker cabinet. Some of the control parameters may control specific audio frequency bands (e.g., low, midrange, and high) within the audio signal, while another may control a full-band or scalar gain that is applied to the audio signal (and that sets an overall volume of the audio output.) The method adjusts the audio signal according to the generated (updated) values of the control parameters, where doing so would reduce power consumption of the loudspeaker cabinet during the audio output in a way that is expected to result in a reduction in temperature in the loudspeaker cabinet.

In one embodiment, to generate the values of control parameters, the method calculates a value of a control effort, based on a difference between the operating power level and the target power level. The control effort changes in proportion to the difference and represents a power consumption mitigation effort required to meet the target power level. The method retrieves the values of control parameters from a lookup table, using the calculated control effort value as an index into the lookup table. The lookup table associates each one of a number of predetermined, different values of the control effort with a respective set of predetermined values of the control parameters.

In one embodiment, when retrieving the values of control parameters from the lookup table, the method obtains, from the lookup table, a first value, a second value, and a third value of three control parameters, respectively, based on the calculated control effort value. The first parameter controls the strength of a first frequency band of the audio signal (e.g., low frequency band, or a portion of the audio signal that may be assigned to a woofer or a sub-woofer in the cabinet.) The second parameter controls the strength of a second frequency band of the audio signal (e.g., middle frequency band, or a portion of the audio signal that may be assigned to a midrange driver in the cabinet.) The third parameter controls the strength of a third frequency band of the audio signal (e.g., high frequency band, or a portion of the audio signal that may be assigned to a tweeter in the cabinet.)

In one embodiment, the first parameter (low frequency band gain) reduces rather abruptly as soon as the control effort starts to increase from its lowest limit, but then essentially levels off once the control effort reaches a threshold. In one embodiment, the second parameter (middle frequency band gain) gradually, not as fast as abruptly, reduces in value as soon as the control effort starts to increase from its lowest limit, and continues to reduce until the control effort reaches its highest limit. In one embodiment, the third parameter (high frequency band gain) reduces more gradually than the second parameter as soon as the control effort starts to increase from its lowest limit but then reduces abruptly as the control effort increases beyond a threshold (exhibiting a "knee".) These embodiments as combined into a single look up table are just one example of the possible behavior of the control parameters. As the parameters reduce in value as a function of control effort, the audio quality may be impacted adversely due to the reduced strengths in the various frequency bands, but power and thermal mitigation increases thereby reducing temperature in the loudspeaker cabinet.

In one embodiment, when retrieving the values of control parameters from the lookup table, the method obtains, from the lookup table, a fourth value of a fourth control parameter, based on the calculated control effort value. The fourth parameter controls a full-band gain (e.g., overall volume) of the audio signal. In one embodiment, the fourth parameter either stays flat or reduces very gradually, as the control effort starts to increase from its lowest limit, and then abruptly reduces in value as the control effort increases beyond a threshold, which may indicate that the loudspeaker cabinet is in a compromised situation, e.g., operating with excessive heat.

Generally, to reduce temperature in the loudspeaker cabinet without sacrificing the listener's experience, it is important to find or locate one or more sources within the cabinet that consume most of the total power drawn by the cabinet. It is also important to make reductions in certain frequency bands that would be less noticeable to a listener, before reducing frequency bands that are more audible (provided that doing so will lead to a meaningful reduction in temperature.) For example, changes in low frequency sound, such as produced by a subwoofer, are less noticeable to a human ear than similar changes in middle and high frequency sound. As such, it is preferable to first reduce or throttle the strength of low frequency audio, so as to not sacrifice the listener's experience. Moreover, the strengths of these audio frequencies should be gradually, steadily, or otherwise linearly reduced as the temperature in the cabinet increases, so that the listener's experience does not suffer. In contrast, the human ear is quite sensitive to changes in the overall volume (or full band gain) of an audio signal, and therefore, a decrease in volume would immediately be noticeable by the listener. As such, the overall volume of the audio output by the cabinet should be maintained at the listener's desired level as long as possible, until a compromised situation occurs (e.g., overheating), at which point the volume is decreased to for example prevent overheating damage to the cabinet.

In another embodiment, two or more loudspeakers cabinets may operate in a network of loudspeaker cabinets as master and slave in order to output an audio signal (which may contain multiple audio channels) of the piece of sound program content, at different locations. However, in certain situations, one cabinet may require a higher power and thermal mitigation than the other (due to for example being positioned in direct sunlight), and the cabinet that requires the higher mitigation would, if the thermal and power mitigation method described above were running, generally output lower audio quality as compared to the other. This difference in audio quality between the two loudspeaker cabinets would cause the listening experience to be out of sync, thereby adversely impacting the listener's experience. Accordingly, it is preferable to have both loudspeaker cabinets to operate with the same thermal and power mitigation so that both loudspeaker cabinets would output similar audio quality. Therefore, in conjunction with generating the control parameter values that adjust the audio output by a first loudspeaker cabinet (in response to a control effort value that was computed for the first loudspeaker cabinet), the method receives (via a wireless transmission) a further control effort value from a second loudspeaker cabinet, which may be determined as per the method described above (with the target and operating power levels being those of the second loudspeaker cabinet.) The method then determines whether the calculated control effort value for the first cabinet is higher than the further control effort value received from the second cabinet. The method wirelessly transmits the higher of (i) the calculated control effort value and (ii) the further control effort value, to the second loudspeaker cabinet. This instructs a similar method (similar to the one described above) that may be running in the second cabinet to use the control effort value that it has just received as an index to the look up table, because it is higher than the one it had computed and sent out earlier. As a result, the process running in the first cabinet will use the higher of the two control effort values for generating its control parameter values (rather than its own, previously calculated control effort value), thereby yielding balanced thermal and power mitigation across the two loudspeaker cabinets and thus a balanced change in audio output quality.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness and reducing the total number of figures, a given figure may be used to illustrate the features of more than one embodiment of the invention, and not all elements in the figure may be required for a given embodiment.

FIG. 2 shows an example of a lookup table of the controller, according to one embodiment of the invention.

DETAILED DESCRIPTION

Several embodiments of the invention with reference to the appended drawings are now explained. Whenever the shapes, relative positions and other aspects of the parts described in the embodiments are not explicitly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1A:
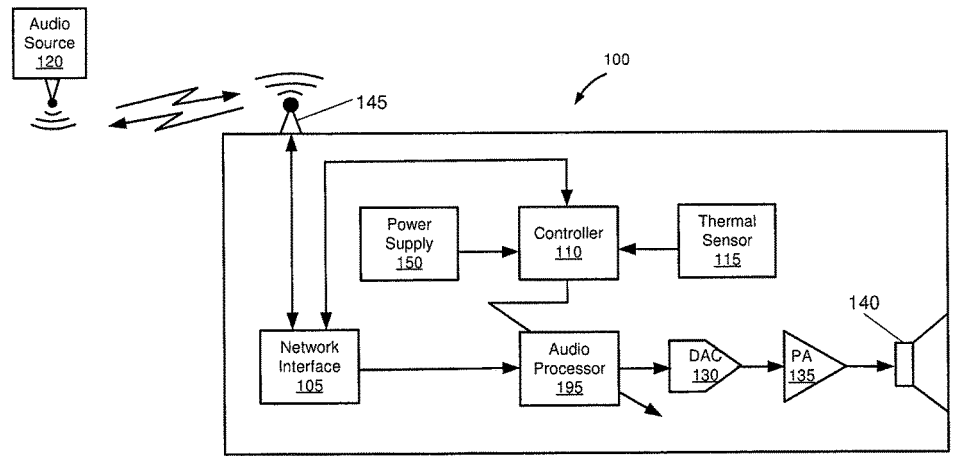
FIG. 1A is a block diagram of a loudspeaker cabinet according to one embodiment of the invention.

FIG. 1A is a block diagram of a loudspeaker cabinet 100 according to one embodiment of the invention. The loudspeaker cabinet 100 may be used for streaming an audio signal of a piece of sound program content (e.g., a musical work, or a movie sound track), and rendering and output (playback) of the audio signal. Rendering, for example, may include digital processing of some or all of the input audio signal, to for example perform spectral shaping or dynamic range control upon some of the audio signal, create a downmix from multiple channels in the audio signal, performing beamformer processing to produce speaker driver signals for a loudspeaker transducer array (in the loudspeaker cabinet), or other digital processing to produce speaker driver signals that may better "match" the acoustic environment of the loudspeaker cabinet or its transducer capabilities, while playback refers to conversion of the resulting digital speaker drivers signals into sound by acoustic transducers that may also be integrated within the cabinet.

Accordingly, in FIG. 1A, cabinet 100 wirelessly communicates with a wireless audio source 120, for example, over a wireless computer network in order to retrieve an audio signal (which may include multiple audio channels or audio objects of a piece of sound program content). The audio source 120 may provide a digital audio signal or an analog audio signal to the loudspeaker cabinet 100. Once received, the loudspeaker cabinet 100 may perform various operations on the audio signal, including streaming, rendering and output of the audio signal.

The audio source 120 may be any device that is capable of streaming an audio signal to the loudspeaker cabinet 100, while the audio signal is being outputted (played back) by the loudspeaker cabinet 100. For example, the audio source 120 may be a desktop computer, a laptop, or a mobile device (e.g., a smartphone or tablet). To stream the audio signal, the audio source 120 may retrieve the audio signal locally (e.g., from an internal or external hard drive; or from an audio playback device, such as a cassette tape player) or remotely (e.g., over the Internet). If the audio signal is retrieved remotely, the audio source 120 may retrieve the audio signal through an access point (e.g., wireless router) or over the air (e.g., a cellular network). In one embodiment, rather than being wireless, the audio source may be connected to the loudspeaker cabinet 100 through a wired connection (e.g., a Universal Serial Bus connection).

Referring to FIG. 1A, the cabinet 100 includes a wireless antenna 145, a network interface 105, a controller 110, a thermal sensor 115 (e.g. any suitable temperature sensing device that is suitable for sensing temperature of the component to which the device may be mounted), an audio processor 195, a digital-to-analog converter (DAC) 130, a power amplifier (PA) 135, a loudspeaker transducer 140, and a power supply 150. The loudspeaker cabinet 100 may be any computing device that is capable of wireless audio transmission and playback (output) of a piece of sound program content. For example, the loudspeaker cabinet 100 may be a multi-function electronic device that has an integrated speaker (e.g., a consumer electronics device), such as a laptop computer, a desktop computer, a tablet computer, a smartphone, or a speaker dock. Or, the cabinet 100 may be a standalone wireless loudspeaker. In one embodiment, the loudspeaker cabinet 100 may be a part of a home audio system. In another embodiment, rather than being a part of a home audio system, the cabinet 100 may be a part of an audio system (e.g., infotainment system) in a vehicle. Each element of the loudspeaker cabinet 100 shown in FIG. 1A will now be described.

The audio processor 195 may interact with the network interface 105 to receive data over a network (e.g., P2P distributed wireless network or wireless local area network) using antenna 145. For instance, if the audio processor 195 wants to fetch an audio signal of a particular piece of audio program content, the audio processor 195 may send a request to the audio source 120 through the network interface 105 and antenna 145. Once the audio signal (or at least a portion of the audio signal) of the piece of audio program content is received, the audio processor 195 may then use the received audio signal (or some of the received audio signal) for rendering or processing.

In some embodiments, the audio signal of the piece of sound program content received by the audio processor 195 may be digital data that requires signal processing. In particular, the digital data received by the audio processor 195 may be encoded using any suitable audio codec, e.g., Advanced Audio Coding (AAC), MPEG Audio Layer II, MPEG Audio Layer III, and Free Lossless Audio Codec (FLAC). In order to process the digital data, the audio processor 195 may include a decoder that is for decoding and outputting an input digital audio. The audio signal in this case may be a single input audio channel. Alternatively, however, there may be more than one input audio channel, such as a two-channel input, namely left and right channels of a stereophonic recording of a music work, or there may be more than two input audio channels, such as for example the entire audio soundtrack in 5.1-surround format of a motion picture film or movie. In the case in which the audio signal may include multiple channels, the audio processor 195 may also include an encoder for re-encoding the processed digital audio for subsequent transmission to other loudspeaker cabinets to decode and playback other audio channels (or the same audio channel as this cabinet).

The controller 110 may be implemented as any suitable combination of electronic circuit components, including a programmed digital processor or microcontroller, and a set of hardwired analog circuit and logic circuits (e.g., filters, arithmetic logic units, and dedicated state machines). In one embodiment, some or all of the functions of the controller 110 and the audio processor 195 may be performed by appropriately programming a system on a chip (SoC), or a central processing unit (CPU.) The controller 110 may perform several management functions that include receiving and processing digital information from the different components of the loudspeaker cabinet as shown and as described below.

In one embodiment, the controller 110 may receive temperature data from the thermal sensor 115 that indicates a current internal temperature of the loudspeaker cabinet 100. The thermal sensor 115, in some embodiments, may measure temperature of a component (e.g., the network interface 105, the controller 110, the audio processor 195, PA 135, or power supply 150) or a combination of components within the loudspeaker cabinet 100. In one embodiment, the thermal sensor 115 measures a temperature of a voice coil of the transducer 140. The thermal sensor 115, in other embodiments, measures the internal temperature of air inside the loudspeaker cabinet 100, as opposed to the temperature of a particular component. There may be more than one thermal sensor 115, measuring the temperature of more than one component, resulting in temperature data that reflects the temperatures of more than component or location of the loudspeaker cabinet 100. In addition, temperature data may include a virtual temperature of a location in the loudspeaker cabinet at which there is no thermal sensor (e.g., an outside surface of its external housing); the virtual temperature may be computed using a remote temperature sensing mathematical relationship, based on actual temperature sensor measurements that are being taken from other locations in the loudspeaker cabinet.

The controller 110 may use at least some (or all) of the temperature data for determining (e.g., calculating using a predefined, mathematical relationship that has been determined in a laboratory setting for the particular design of the loudspeaker cabinet 100) a target power level for the cabinet 100, and uses the target power level for further processing, as further described below in connection with FIG. 1B. The target power level may be referred to as a desired operating power level by the cabinet 100 during audio output (playback), or the desired level of power consumption, by either the entire loudspeaker cabinet or just by selected "power hungry" components of the loudspeaker cabinet. The target power level may be viewed as an upper power consumption limit, which may ensure that the cabinet 100 is not in a compromised situation (e.g., overheating). There may be a direct and proportional relationship between the temperature data and the target power level, so that as the temperature of the loudspeaker cabinet increases, the target power level decreases.

The controller 110 also determines an operating power level based on for example voltage and current measurements from the power supply 150 while the latter supplies power to operate at least the power hungry components of the loudspeaker cabinet 100, including the network interface 105, the audio processor 195, the DAC 130, and the PA 135 that is driving the transducer 140. The power supply 150 may include an AC-DC power converter (to convert AC power from a wall socket), and a DC-DC power converter (to regulate and change the level of a DC battery) as needed by the power supply requirements of the components within the cabinet 100. The power supply 150 may be composed of several elements that provide power to different components (e.g., a low voltage supply to power the digital signal processing components, and a high voltage supply to power the PA 135.) The operating power level may refer to the present or actual power consumption of the components encompassed by the target power level that are expected to contribute to a majority of heat production in the loudspeaker cabinet (e.g., the network interface 105, the controller 110, the audio processor 195, the DAC 130 and the PA 135).

Upon receiving the digital audio, the audio processor 195 may adjust the digital audio based on several factors. For instance, the digital audio may be modified according to user preferences (e.g., a particular spectral shape of the audio or a particular volume of the audio) or according to the particular playback (sound conversion) capabilities of the loudspeaker cabinet, in order for this particular cabinet to output modified audio. This is generally referred to as "rendering" the input digital audio into transducer (speaker driver) input signals, in digital form. In one embodiment, in addition to the usual rendering operations, the audio processor 195 may further adjust or modify the digital audio based on the control parameters, in order to mitigate power consumption of the cabinet 100 to a target power level, thereby reducing the internal temperature of the cabinet 100 and alleviating the cabinet 100 from overheating.

The DAC 130 may receive a digital audio transducer drive signal that is produced by the audio processor 195 and convert it into an analog input. The PA 135 may receive the analog input from the DAC 130 and provide an analog drive signal to the transducer 140. Although the DAC 130 and the PA 135 are shown as separate blocks, in one embodiment the electronic circuit components for these may be combined, not just for a single transducer but also for multiple transducers (such as part of a loudspeaker array), in order to provide for a more efficient digital to analog conversion and amplification operation of the individual driver signals, e.g., using for each class D amplifier technologies.

The transducer 140 may represent one or more individual transducers or speaker drivers (e.g., a tweeter, a midrange, and a woofer or a sub-woofer; or a loudspeaker array containing a combination of the different types of drivers) whose drive signals are provided from the PA 135 and are converted into sound. An individual transducer may be an electrodynamic driver that may be specifically designed for sound output at a particular frequency band, such as a subwoofer, tweeter, or midrange driver, for example. In one embodiment, as previously described, the loudspeaker cabinet 100 may have integrated therein several loudspeaker transducers in a loudspeaker array. For example, the loudspeaker transducers in the array may be arranged side by side in a single row, in the style of a sound bar for example, or forming a ring for example. In the case of a loudspeaker array, the audio processor 195 is configured with a beamformer signal processor that can be programmed to render the digital audio signal into array drive signals that result in one or more sound beams being output by the loudspeaker array (that contain the sound program content.)

Figure 1B:
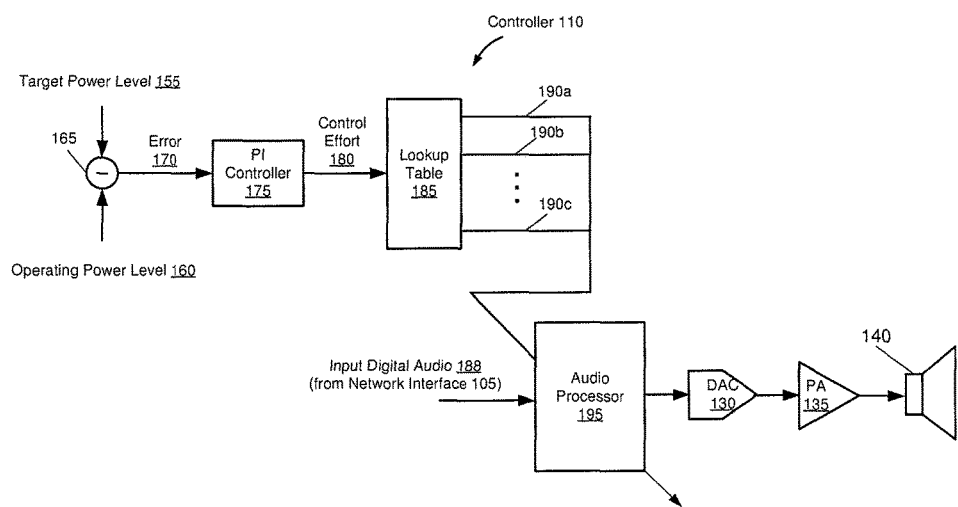
FIG. 1B is a block diagram illustrating in greater detail operation of the controller and the audio processor according to one embodiment of the invention.

FIG. 1B is a block diagram illustrating in greater detail operation of the controller and the audio processor according to one embodiment of the invention. In FIG. 1B, the controller 110 may include a subtractor 165, a proportional-integral (PI) control system compensator (PI controller 175), and a lookup table 185. The subtractor 165 may receive a target power level 155 and an operating power level 160, and generate an error 170 based on the target power level 155 and the operating power level 160. For example, the subtractor 165 may take a difference between the operating power level 160 and the target power level 155, and output the error 170 indicative of the difference. As previously described, the target power level 155 may be determined by the controller 110 based on the temperature data from the thermal sensor 115. For example, the controller 110 may use at least some (or all) of the temperature data for determining (e.g., calculating using a predefined, mathematical relationship that has been determined in a laboratory setting for the particular design of the loudspeaker cabinet 100) the target power level 155 for the cabinet 100, and provides the target power level 155 to the subtractor 165 for processing, as described above. As also previously described, the controller 110 also determines the operating power level 160 based on for example voltage and current measurements from the power supply 150, while the power supply 150 supplies power to operate at least the power hungry components of the loudspeaker cabinet 100, including the network interface 105, the audio processor 195, the DAC 130, and the PA 135 that is driving the transducer 140.

Based on the error 170, which may be updated over time on a periodic basis, the PI controller 175 performs PI digital control compensation functions and outputs a control effort 180, which represents a mitigation effort required to mitigate power consumption of the cabinet 100 to meet the target power level. The control effort 180 may thus be updated over time, on a periodic basis. For instance, the PI controller 175 may perform or execute a PI algorithm, with the error 170 being an input, to gradually smooth the control effort 180 over time. The control effort 180 produced by the PI controller 175 may be proportional to the error 170. For example, if the error is large because the operating power is much smaller than the target, then the control effort is minimal (no need to mitigate); as the error becomes smaller because the operating power is approaching the target, then the control effort should start to increase (to anticipate and prevent overheating.)

In some embodiments, the control effort 180 may have a lowest limit of zero (0) and a highest limit of one (1). The lowest limit may indicate that no mitigation effort is required whereas the highest limit may indicate that maximum mitigation effort is necessary to prevent damages to the cabinet 100. In other embodiments, other numerical ranges for the control effort 180 are possible, e.g., 1-100.

The lookup table 185 uses a value of the control effort 180 as a reference (or an index) to generate values of control parameters 190a-c. The values of control parameters 190a-c at the output of the lookup table may be updated depending on the value of the control effort 180. The control parameters 190a-c may be used by the audio processor 195 to, for example, adjust or modify (e.g., boost, reduce or attenuate, throttle, or maintain) the strength of different frequency bands (e.g., low, middle, and high) within the audio signal that is being rendered. That is, some of the control parameters 190a-c may control, for example, a gain or strength of the transducer drive signals that are driving specific transducers (e.g., subwoofer/woofer, midrange driver, and tweeter) in different frequency bands and thus may affect a particular spectral portion of the input audio signal. For instance, if the control effort 180 indicates that the loudspeaker cabinet is operating with increasing temperature, or is already in a compromised situation as reflected by the error 170 (e.g., operating with excessive heat or overheating), the lookup table 185 may in response to the control effort 180 generate control parameters 190a-c with values that would reduce the strength of several frequency bands within the audio signal for power consumption mitigation. As further described below with respect to FIG. 3, each of the frequency bands may be reduced in a different manner to minimize the adverse impact on the audio quality as perceived by a listener.

As input digital audio 188 is received, the audio processor 195 may adjust or modify the digital audio 188 based on the control parameters 190a-c in order to mitigate power consumption of the cabinet 100 to the target power level 155. For instance, the digital audio 188 may be adjusted according to the values of the control parameters 190a-c provided by the lookup table or derived therefrom (e.g., a low frequency band gain, a middle frequency band gain, a high frequency band gain, and the volume of the digital audio 188) in order to reduce the temperature of the cabinet 100.

Although not shown in FIG. 1B, in some embodiments, the audio processor 195 may include virtual slide controls (or virtual sliders) used to control the strength of different frequency bands. These virtual slide controls may be automatically adjusted (without user input required), by the control parameters 190a-c. In some embodiments, the control parameters 190a-c may also include parameters that control a high pass filter cutoff frequency and low pass filter cutoff frequency associated with the audio signal. That is, these parameters may set certain cutoff frequencies for a high pass filter and a low pass filter, such that only portions of the audio signal with a frequency higher than the high pass filter cutoff frequency, and only portions lower than the low pass filter cutoff frequency, would be outputted (by the transducer 140.)

FIG. 2 shows an example of the lookup table 185 according to one embodiment of the invention. The lookup table 185 may be preconfigured or predefined, e.g., in the laboratory or via a software update to the loudspeaker cabinet while "in the field", in accordance with the curves shown in FIG. 3, described herein below, so as to affect audio signal output of a loudspeaker cabinet (e.g., cabinet 100) while maintaining the quality of the audio output to maintain the listener's experience as much as possible. The example lookup table 185 shown includes a control effort column 210 and control parameter columns 215-230. Each of the control effort values in the control effort column 210 is a reference to obtain a set of control parameter values from the control parameters columns 215-230. That is, the values in a single row of the control parameter columns 215-230 are mapped to a corresponding control effort value in that row of the control effort column 210. As an example, if a control effort has value of "0" (e.g., from PI controller 175) is provided to the lookup table 200 (which may be a multi-dimensional array in some embodiments) as a reference, then the row corresponding to "0" would be retrieved or obtained to form the set of control parameter values. That is, "Value 1" from each of the control parameter columns 215-230 would be retrieved to generate the set of control parameter values to control the strength of various frequency bands within an audio signal. On the other hand, if a control effort value of "0.2" is provided to the lookup table 200 as a reference, then "Value 3" from each of the control parameter columns 215-230 would be retrieved to generate the set of control parameter values to control the strength of various frequency bands within the audio signal.

As previously discussed with respect to FIG. 1B, some of the control parameters from the control parameter columns 215-230 controls (e.g., boost, reduce, or maintain) different frequency bands within an audio signal. As an example, and not limited to the following order of assignments, control parameter values from the control parameter column 215 may be assigned to control a low frequency band gain. Control parameter values from the control column 220 may be assigned to control a middle frequency band gain. Control parameter values from the control column 225 may be assigned to control a high frequency band gain. And, control parameters from the control column 230 may be assigned to control the overall volume of the audio signal.

Figure 3:
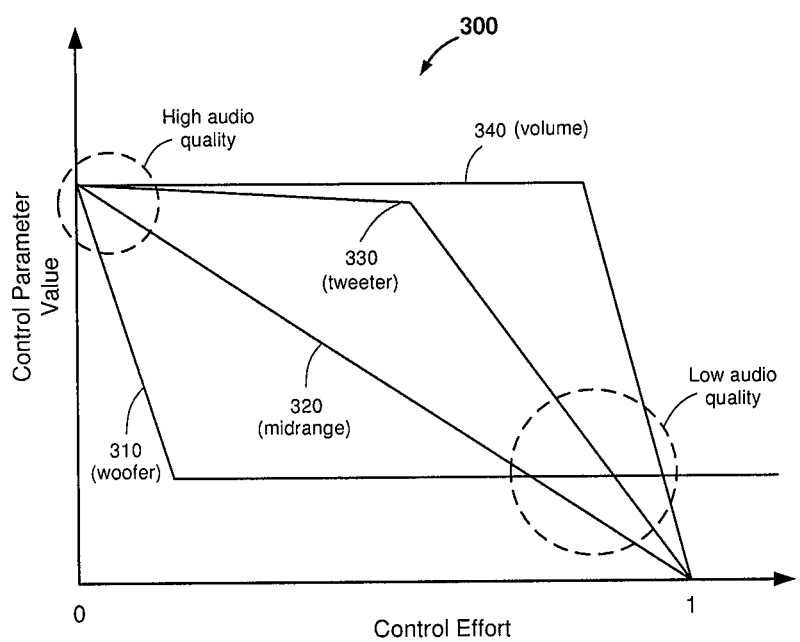
FIG. 3 is a diagram showing techniques for controlling audio output of a loudspeaker cabinet according to one embodiment of the invention.

FIG. 3 is a diagram 300 showing example relationships between the control effort and four control parameters that may be stored in the lookup table The control effort is on the x-axis while the control parameter values are on the y-axis, with several curves plotted on this graph. A curve 310 may represent a manner a control parameter (e.g., control parameter 215 of FIG. 2) controls a strength of a low frequency band. Generally, small changes in low frequency sound is less noticeable to a listener than equivalent level changes in high frequency sound, and therefore, it is preferable to make reductions in low frequency band prior to reducing frequency bands that are more audible, e.g., middle and high frequency bands. Accordingly, as shown in curve 310, the control parameter may abruptly reduce in value as soon as the control effort starts to increase from its lowest limit (e.g., 0), but then levels off (e.g., flattens out or reduces very gradually) once the control effort reaches a threshold (e.g., 0.2 or 0.3).

A curve 320 may represent the manner in which the control parameter 220 of FIG. 2 controls the strength of a middle frequency band. In general, a change in the level of midrange frequency sound is more audible to a listener as opposed to an equivalent change in the level of low frequency sound, and thus, a steady or gradual decrease in the strength of middle frequency band is desirable (when an increase in the cabinet's temperature occurs) to minimize the impact on the listener. Accordingly, as shown in curve 320, this control parameter gradually (rather than abruptly) reduces in value as soon as the control effort begins to increase from its lowest limit (e.g., 0), and continues to reduce until the control effort reaches its highest limit (e.g., 1). In other words, the slope of the midrange curve 320 is lower than the slope of the initial part of the woofer curve 310, and then after a control effort threshold is reached the slope of the woofer curve 310 becomes lower than that of the midrange curve 320. In some embodiments, the reduction the midrange curve 320 may occur at a fixed reduction rate (fixed slope) such that the control parameter reduces in a linear fashion from the control effort's lowest limit to the control effort's highest limit, although the slope may alternatively be nonlinear but monotonically decreasing although it may also have one or more flat segments.

A curve 330 may represent the manner in which control parameter 225 of FIG. 2 controls the strength of a high frequency band. As with the midrange frequency sound, the listener is more likely to notice a gain change in a high frequency sound than in a low frequency sound. As such, a slow and steady decrease in the strength of high frequency band is also preferable when the cabinet's temperature increases, unless a threshold is reached where additional power mitigation is needed. For example, the tweeter curve 330 reduces more gradually (lower slope) than the midrange curve 320 as soon as the control effort starts to increase from its lowest limit. However, the control parameter then abruptly reduces in value as the control effort increases beyond a threshold (e.g., 0.5 or 0.6).

Referring to curve 340, which may represent the manner in which the control parameter 230 of FIG. 2 controls the strength of a full-band or scalar gain that is applied to the audio signal (which sets an overall volume of the audio output), it is not preferable to reduce the overall volume (e.g., a full band gain change), immediately in response to the control effort increasing from its lowest limit, because the listener's audio experience may suffer. The overall volume should only be reduced when the loudspeaker cabinet is in a compromised situation, for example, operating with excessive heat, which may damage the components within the cabinet or may simply make the housing of the cabinet too warm. Accordingly, as shown in curve 340, the control parameter either remains flat or very gradually reduces in value as the control effort starts to increase from its lowest limit. However, the control parameter then abruptly reduces in value as the control effort increases beyond another threshold (e.g., 0.8). This threshold may be an indicator that a compromised situation has occurred, e.g., overheating.

As shown in FIG. 3, the control effort has been designed to have a lowest limit of zero (0) and a highest limit of one (1). In this case, the value of zero would indicate no mitigation effort whereas the value of one would indicate maximum mitigation effort. As such, in FIG. 3, high quality audio is outputted when the control effort is closer to zero as lower mitigation effort is required, whereas low quality audio is outputted when the control effort is closer to one as higher mitigation effort is required. In addition, it is important to note that this design is merely an example for the convenience of explaining the concept. Other numerical ranges for the control effort are possible, e.g., 1 to 100. Also, mapping the control effort to a smaller number as referring to a lower mitigation effort, and to a larger number as referring to a higher mitigation effort, is done here only for the ease of understanding the concept. Doing so in the reverse is also possible, for example, where a lower mitigation effort is mapped to a larger number, and a higher mitigation effort is mapped to a smaller number. Thus, references to the terms "lower" and "higher" or "increases" and "decreases" in connection with the control effort and the control parameters should be interpreted in context or as relative terms, not as absolute terms.

Figure 4:
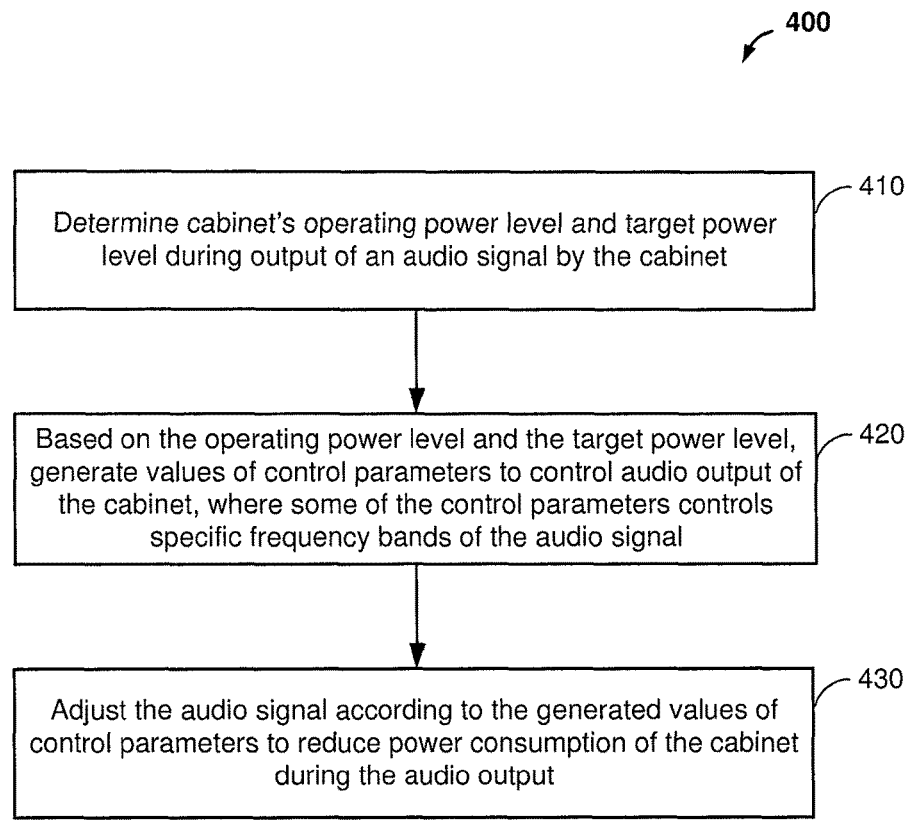
FIG. 4 is a flowchart of a process to operate a loudspeaker cabinet according to one embodiment of the invention.

FIG. 4 is a flowchart of a process 400 to operate a loudspeaker cabinet according to one embodiment of the invention. The process of 400 may performed by the controller 110 and the audio processor 195 of FIG. 1A. As shown in FIG. 4, process 400 may begin by determining (at block 410) the cabinet's operating power level (e.g., power consumption level) and target power level during output of an audio signal by the cabinet. The controller 110 may receive temperature information from the thermal sensor 115 and determine the target power level based on the temperature information. This temperature information may be representative of an ambient internal temperature within the cabinet or a temperature of a particular component (e.g., that of the audio signal processor 195, the PA 135, or a voice coil of the transducer 140), as previously described. As also previously described, the operating power level may be determined by the controller 110 based on for example voltage and current measurements from the power supply 150 while the power supply 150 supplies power to operate at least the power hungry components of the loudspeaker cabinet 100 (e.g., the network interface 105, the audio processor 195, the DAC 130, and the PA 135 that is driving the transducer 140).

The process 400 (at block 420) generates values of control parameters to control audio output of the cabinet based on the operating power level and the target power level, where some of the control parameters controls specific frequency bands of the audio signal. As shown in FIG. 1B, the operating power level 160 and target power level 155 may be used to compute the control effort 180, based on a mathematical relationship that has been previously determined for example in a laboratory setting, taking into account the thermal and power consumption characteristics of the loudspeaker cabinet. The control effort 180 may be used as a reference or index into the lookup table 185, to retrieve the control parameters 190*a-c*. Some of the control parameters control the gain within particular frequency bands within the audio signal (during its output or playback). The process 400 (at block 430) adjusts the audio signal according to the generated values of control parameters, to reduce power consumption of the cabinet during audio output and therefore reduce temperature in the cabinet. In other words, the lookup table 185 of FIG. 1B may generate control parameters 190*a-c* with values that would reduce the strength of different frequency bands within the audio signal to mitigate power consumption. As illustrated in FIG. 3, the strength of different frequency bands may be reduced in different ways so that the audibility or quality of the audio signal being output is sacrificed only as much as needed. Note also that the actual gain adjustments applied to the audio signal may not be exactly the same as the control parameter values that output by the lookup table 185—there may for example be some scaling applied to the control parameter values that are output from the lookup table 185 or some formulaic derivation applied to them, to derive the gain adjustment values that are applied to adjust the audio signal.

Figure 5:
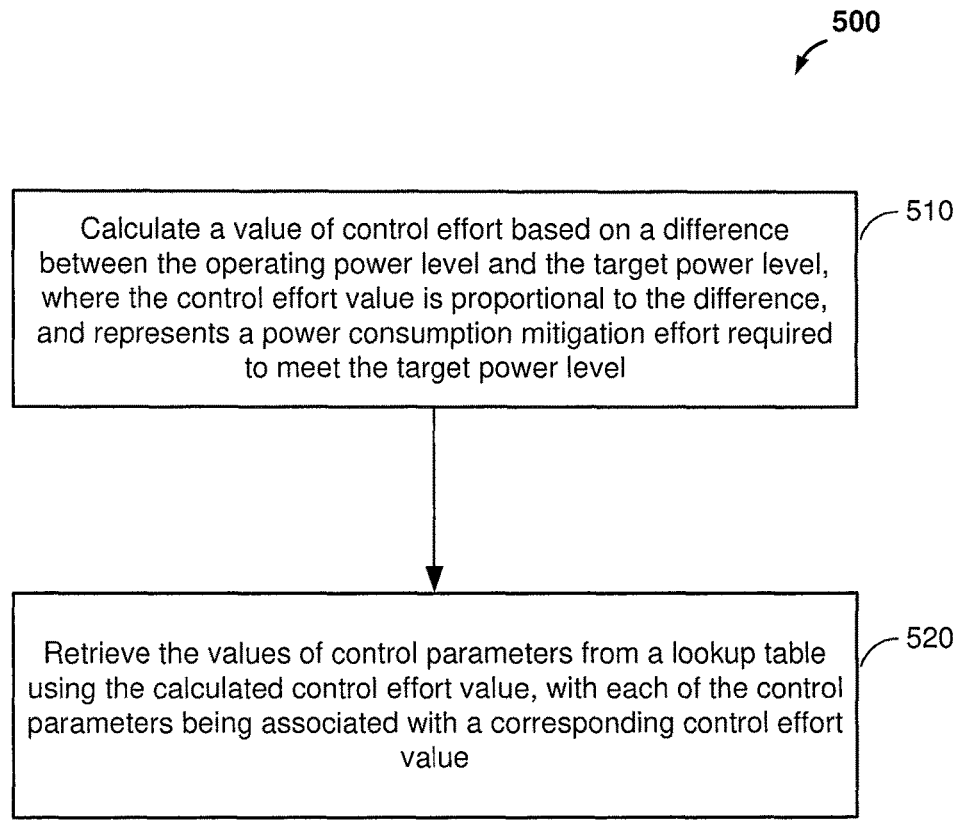
FIG. 5 is a flowchart of a process to generate control parameters for controlling audio output of a loudspeaker cabinet according to one embodiment of the invention.

FIG. 5 is a flowchart of a process to generate control parameters for controlling audio output of a loudspeaker cabinet according to one embodiment of the invention. The process of 500 may performed by the controller 110 of FIG. 1A, the audio processor 195 of FIG. 1A, or a combination of the controller 110 and the audio processor 195. As shown in FIG. 5, process 500 begins (at block 510) by calculating a value of control effort based on a difference between the operating power level and the target power level, where the control effort value is proportional to the difference and represents a power consumption mitigation effort, e.g., one that is needed to meet the target power level. Referring to FIG. 1B, for example, the target power level 155 (which may be determined by the controller 110 of FIG. 1A) and operating power level 160 (which may also be determined by the controller 110) are provided to subtractor 165 to generate error 170. The error 170 represents a difference between the operating power level 160 and target power level 155. The error 170 is provided to the PI controller 175, which then generates the control effort 180 based on smoothing or other conditioning of the error 170 (here, in accordance with a proportional-integral, PI, control system compensation rule.) The process 500 (at block 520) retrieves the control parameters from a lookup table (e.g., the lookup table 185, see FIG. 2) using the calculated control effort value.

Figure 6:
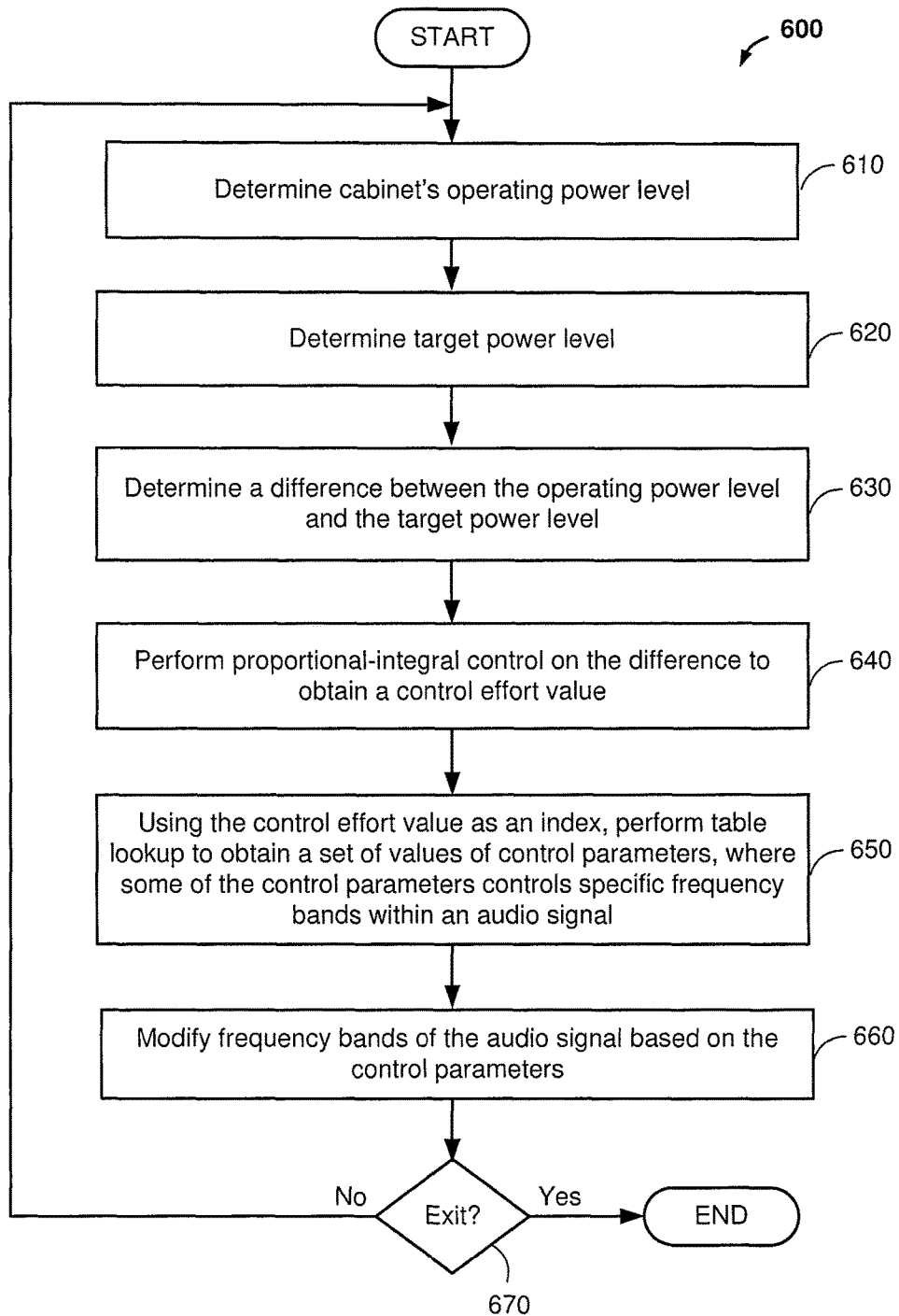
FIG. 6 is a flowchart of a further process to operate a loudspeaker cabinet according to one embodiment of the invention.

FIG. 6 is a flowchart of a further process to operate a loudspeaker cabinet according to one embodiment of the invention. The process of 600 may performed by the controller 110, the audio processor 195 of FIG. 1A, or a combination of the controller 110 and the audio processor 195. As shown in FIG. 6, process 600 begins (at block 610) by determining the cabinet's operating power level. The operating power level may be determined by the controller 110 based on for example voltage and current measurements from the power supply 150 while the power supply 150 supplies power to operate at least the power hungry components of the loudspeaker cabinet 100, including the network interface 105, the audio processor 195, the DAC 130, and the PA 135 that is driving the transducer 140. The process 600 (at block 620) determines the target power level. For example, the controller 110 may determine the target power level based on the cabinet's temperature, e.g., as one or more temperature readings received from one or more thermal sensors 115, which may provide the sensed temperature of a component or a combination of components within the loudspeaker cabinet 100 such as a voice coil of the transducer 140, the power amplifier, or other components or parts of the loudspeaker cabinet. Alternative or additionally, the cabinet's temperature information received from a thermal sensor 115 may be internal air temperature of the cabinet 100. The temperature information used to compute the target power level may also include a virtual temperature of a particular location at which there is no thermal sensor (as mentioned earlier.)

The process 600 (at block 630) determines a difference between the operating power level and the target power level. To illustrate, referring to FIG. 1B, the subtractor 165 computes the difference between the operating power level 160 and the target power level 155, and generates the error 170 representing the difference. The process 600 (at block 640) performs proportional-integral control on the difference to obtain a value of control effort. Again looking at FIG. 1B, the PI controller 175 may perform PI algorithm on the input error 170 to produce the control effort 180. The process 600 (at block 650) performs table lookup to obtain a set of values of control parameters using the control effort value as a reference, where some of the control parameters controls specific frequency bands within an audio signal. As shown in FIG. 1B, the lookup table 185 uses the control effort 180 as a reference to generate the control parameters 190*a-c*. The control parameters 190*a-c*, for example, may be used to adjust or modify (e.g., boost, reduce, or maintain) the strength of different frequency bands (e.g., low, middle, and high) of the audio signal. The process 600 (at block 660) modifies the frequency bands in the audio signal based on the control parameters. For instance, each frequency band is modified or adjusted differently depending on the values of the control parameters. As previously discussed with respect to FIG. 3, for example, low frequency band is generally less noticeable to the listener, and thus, the strength of low frequency band may be abruptly reduced as soon as the control effort starts to increase from its lowest limit and then levels off once the control effort reaches a particular threshold. Middle frequency band, on the other hand, is generally more noticeable and therefore, a gradual or steady decrease in the strength of middle frequency band is preferable as the control effort increases from its lowest limit. As with the middle frequency band, high frequency band is also noticeable and a more gradual decrease than the middle frequency band in the strength as the control effort increases from its lowest limit is also preferable, unless a threshold is reached where the strength of the high frequency band is abruptly reduced as the control effort increases beyond the threshold. With respect to volume, generally it is not preferable to reduce the overall volume as a listener's audio experience may suffer. The overall volume should stay flat or very gradually reduced unless the control effort reaches a threshold that indicates a compromised situation has occurred, for example, overheating which may damage the components within the cabinet. In this case, the volume may be abruptly reduced as the control effort increases beyond the threshold.

Figure 7:
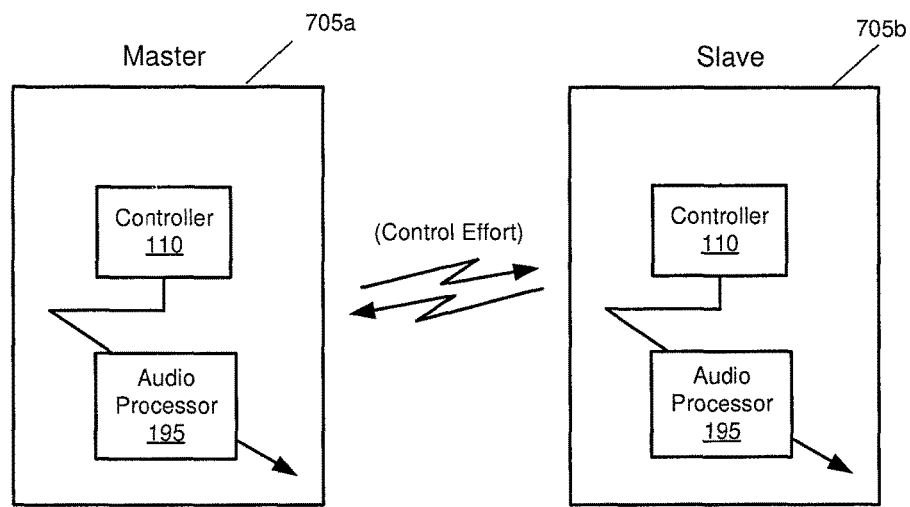
FIG. 7 shows two loudspeaker cabinets operating in a master and slave configuration according to one embodiment of the invention.

FIG. 7 shows two loudspeaker cabinets operating in a master and slave configuration according to one embodiment of the invention. Each of the cabinets 705*a-b* may include and implement the architecture that was described in FIGS. 1A and 1B, including the operation of the controller 110 and the audio processor 195 that enables each cabinet to operate by its own in a "solo" mode, where each manages its own thermal and power mitigation as described above. In one embodiment, the two loudspeaker cabinets are replicates in terms of their audio rendering and audio output capabilities, and may have similar thermal and power consumption characteristics such that their mitigation efforts will be similar.

In another mode of operation, the cabinets 705*a-b* operate in a master and slave configuration. In the example shown, the cabinet 705*a* is the master and cabinet 705*b* is the slave. In this mode of operation, the following protocol may be followed. The slave cabinet 705*b* may transmit its control effort value to the master cabinet 705*a* (e.g., using any suitable wireless communications link that connects the two loudspeaker cabinets). The master cabinet 705*a*, for example via its controller 110, may then compare its control effort value against the control effort value received from the slave cabinet 705*b*, to determine the higher of the two control effort values. The master cabinet 705*a* may then provide the higher of the two control effort values (rather than the control effort value that it generated based on its target and operating power levels) to its lookup table, as an index to generate its values of control parameters. Additionally, the master cabinet 705*a* may transmit the higher of the two control effort values to the slave cabinet 705*b*, and in response the slave cabinet 705*b* will use this, externally received control effort value (received from the master), instead of the control effort value that it generated based on its operating and target power levels, as an index to its lookup table to generate its values of control parameters. Accordingly, in this master and slave mode of operation, both cabinets 705*a-b* will operate with the same thermal and power mitigation, in accordance with the same, higher control effort value. As previously discussed, this operation ensures that the two loudspeaker cabinets 705*a-b* would output similar audio quality so that the user's listening experience does not go out of sync as between a left cabinet and a right cabinet, for example, while ensuring that both cabinets 705*a-b* avoid overheating.

As previously explained, an embodiment of the invention may be a non-transitory machine-readable medium (such as microelectronic memory) having stored thereon instructions, which program one or more data processing components (generically referred to here as a "processor") to perform the digital signal processing operations previously described including receiving an operating power level and a target power level, generating different values of control parameters for controlling audio output of the loudspeaker cabinet, and adjusting the audio signal according to the generated values. In other embodiments, some of these operations might be performed by specific hardware components that contain hardwired logic (e.g., dedicated digital filter blocks, state machines). Those operations might alternatively be performed by any combination of programmed data processing components and fixed hardwired electronic circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A method for operating a loudspeaker cabinet, the method comprising:
    determining an operating power level for a first loudspeaker cabinet and a target power level for the first loudspeaker cabinet, during output of an audio signal as sound by the first loudspeaker cabinet, wherein the target power level is determined based on temperature data for the first loudspeaker cabinet and is variable as the temperature data changes;
    calculating a value of a control effort based on a difference between the operating power level and the target power level, generating, with the control effort, a plurality of values of a plurality of control parameters for controlling audio output of the first loudspeaker cabinet, wherein some of the plurality of control parameters controls specific audio frequency bands within the audio signal; and
    adjusting the audio signal according to the generated values of the control parameters to reduce power consumption of the first loudspeaker cabinet during its output of the audio signal.

2. The method of claim 1,
    wherein the control effort changes in proportion to the difference and represents a power consumption mitigation effort; and
    generating the plurality of values of the control parameters includes retrieving the plurality of values of control parameters from a lookup table using the calculated control effort value as an index into the lookup table, wherein the lookup table associates each one of a plurality of predetermined values of the control effort with a respective plurality of predetermined values of the control parameters.

3. The method of claim 2, wherein retrieving the values of control parameters from the lookup table includes:
    obtaining, from the lookup table, a first value, a second value, and a third value of three control parameters, respectively, based on the calculated control effort value,
    wherein a first control parameter controls a gain of a first frequency band of the audio signal,
    wherein a second control parameter controls a gain of a second frequency band of the audio signal, and
    wherein a third control parameter controls a gain of a third frequency band of the audio signal.

4. The method of claim 3,
    wherein the first control parameter abruptly reduces in value when the control effort increases from a lowest limit, and levels off once the control effort reaches a first threshold,
    wherein the second control parameter gradually reduces in value when the control effort increases from the lowest limit and continues to reduce until the control effort reaches a highest limit, and
    wherein the third control parameter reduces more gradually than the second parameter in value when the control effort increases from the lowest limit, and abruptly reduces in value as the control effort increases beyond a second threshold that is greater than the first threshold.

5. The method of claim 4, wherein retrieving the values of control parameters from the lookup table further includes:
    obtaining, from the lookup table, a fourth value of a fourth control parameter, respectively, based on the calculated control effort value
    wherein the fourth control parameter controls a full-band gain of the audio signal,
    wherein the fourth control parameter either remains flat or reduces gradually in value as the control effort increases from the lowest limit, and abruptly reduces in value as the control effort increases beyond a third threshold that is greater than the second threshold, the third threshold indicating the first loudspeaker cabinet is operating in a compromised situation.

6. The method of claim 5, wherein the first frequency band is a low frequency band, the second frequency band is a middle frequency band, the third frequency band is a high frequency band, and the full-band gain is an overall volume of the audio signal.

7. The method of claim 4, wherein adjusting the audio signal according to the generated values of the control parameters comprises:
    adjusting gain in each of a plurality of frequency bands of the audio signal, according to the generated values of the control parameters.

8. The method of claim 2, further comprising:
    receiving a further value of control effort from a second loudspeaker cabinet;
    determining whether the calculated control effort value for the first loudspeaker cabinet is higher than the further control effort value for the second loudspeaker cabinet;
    wirelessly transmitting the higher of (i) the calculated control effort value and (ii) the further control effort value, to the second loudspeaker cabinet; and
    wherein generating the plurality of values of control parameters comprises retrieving the plurality values of control parameters from the lookup table using the higher of (i) the calculated control effort value for the first loudspeaker cabinet and (ii) the further control effort value for the second loudspeaker cabinet, as the index to the lookup table.

9. A loudspeaker cabinet comprising:
    a plurality of electro-acoustic transducers;
    a digital to analog converter and a power amplifier to receive a plurality of digital, transducer drive signals, and coupled to drive the transducers;
    a network interface to receive an input digital audio signal;
    an audio processor to render the input digital audio signal into said plurality of digital, transducer drive signals in accordance with a plurality of control parameters; and
    a controller to
        determine an operating power level for the loudspeaker cabinet and a target power level for the loudspeaker cabinet, during output of an audio signal as sound through the transducers the loudspeaker cabinet, wherein the target power level is determined based on temperature data for the loudspeaker cabinet and is variable as the temperature data changes;

calculate a value of a control effort based on a difference between the operating power level and the target power level, generate, with the control effort, a plurality of values of a plurality of control parameters for controlling audio output of the loudspeaker cabinet, wherein one of the plurality of control parameters controls a specific audio frequency band within the audio signal; and adjust the audio signal according to the generated values of the control parameters to reduce power consumption of the loudspeaker cabinet during its output of the audio signal.

10. The loudspeaker cabinet of claim 9, wherein the control effort changes in proportion to the difference and represents a power consumption mitigation effort required to meet the target power level; and generating the plurality of values of the control parameters includes retrieving the plurality of values of control parameters from a lookup table using the calculated control effort value as an index into the lookup table, wherein the lookup table associates each one of a plurality of predetermined values of the control effort with a respective plurality of predetermined values of the control parameters.

11. The loudspeaker cabinet of claim 10, wherein retrieving the values of control parameters from the lookup table comprises:

obtaining, from the lookup table, a first value, a second value, and a third value of three control parameters, respectively, based on the calculated control effort value, wherein a first control parameter controls a gain of a first frequency band of the audio signal, wherein a second control parameter controls a gain of a second frequency band of the audio signal, and wherein a third control parameter controls a gain of a third frequency band of the audio signal.

12. The loudspeaker cabinet of claim 11, wherein the first control parameter abruptly reduces in value when the control effort increases from a lowest limit, and levels off once the control effort reaches a first threshold, wherein the second control parameter gradually reduces in value when the control effort increases from the lowest limit and continues to reduce until the control effort reaches a highest limit, and wherein the third control parameter reduces more gradually than the second parameter in value when the control effort increases from the lowest limit, and abruptly reduces in value as the control effort increases beyond a second threshold that is greater than the first threshold.

13. The loudspeaker cabinet of claim 12, wherein retrieving the values of control parameters from the lookup table further comprises:

obtaining, from the lookup table, a fourth value of a fourth control parameter, respectively, based on the calculated control effort value wherein the fourth control parameter controls a full-band gain of the audio signal, wherein the fourth control parameter either remains flat or reduces very gradually in value as the control effort increases from the lowest limit, and abruptly reduces in value as the control effort increases beyond a third threshold that is greater than the second threshold, the third threshold indicating the first loudspeaker cabinet is operating in a compromised situation.

14. The loudspeaker cabinet of claim 13, wherein the first frequency band is a low frequency band, the second frequency band is a middle frequency band, the third frequency band is a high frequency band, and the full-band gain is an overall volume of the audio signal.

15. The loudspeaker cabinet of claim 12, wherein adjusting the audio signal according to the generated values of the control parameters comprises:

adjusting gain in each of a plurality of frequency bands of the audio signal, according to the generated values of the control parameters.

16. The loudspeaker cabinet of claim 10, wherein the controller is further configured to:

receive a further value of control effort from a second loudspeaker cabinet;

determine whether the calculated control effort value for the first loudspeaker cabinet is higher than the further control effort value for the second loudspeaker cabinet;

wirelessly transmit the higher of (i) the calculated control effort value and (ii) the further control effort value, to the second loudspeaker cabinet; and wherein generating the plurality of values of control parameters comprises retrieving the plurality values of control parameters from the lookup table using the higher of (i) the calculated control effort value for the first loudspeaker cabinet and (ii) the further control effort value for the second loudspeaker cabinet, as the index to the lookup table.

17. An article of manufacture comprising a non-transitory machine readable medium storing instructions which when executed by a processor, cause the processor to:

determine an operating power level for the loudspeaker cabinet and a target power level for the loudspeaker cabinet, during output of an audio signal as sound through the transducers the loudspeaker cabinet, wherein the target power level is determined based on temperature data for the loudspeaker cabinet and is variable as the temperature data changes;

calculate a value of a control effort based on a difference between the operating power level and the target power level, generate, with the control effort, a plurality of values of a plurality of control parameters for controlling audio output of the loudspeaker cabinet, wherein some of the plurality of control parameters controls specific audio frequency bands within the audio signal; and adjust the audio signal according to the generated values of the control parameters to reduce power consumption of the loudspeaker cabinet during its output of the audio signal.

18. The article of manufacture of claim 17, wherein the control effort changes in proportion to the difference and represents a power consumption mitigation effort required to meet the target power level; and instructions to generate the plurality of values of the control parameters comprise instructions that when executed by the processor, cause the processor to retrieve the plurality of values of control parameters from a lookup table using the calculated control effort value as an index into the lookup table, wherein the lookup table associates each one of a plurality of predetermined values of the control effort with a respective plurality of predetermined values of the control parameters.

19. The article of manufacture of claim 18, wherein instructions to retrieve the values of control parameters from the lookup table comprise instructions that when executed by the processor, cause the processor to:
   obtain, from the lookup table, a first value, a second value, and a third value of three control parameters, respectively, based on the calculated control effort value,
   wherein a first control parameter controls a gain of a first frequency band of the audio signal,
   wherein a second control parameter controls a gain of a second frequency band of the audio signal, and
   wherein a third control parameter controls a gain of a third frequency band of the audio signal.

20. The article of manufacture of claim 19,
   wherein the first control parameter abruptly reduces in value when the control effort increases from a lowest limit, and levels off once the control effort reaches a first threshold,
   wherein the second control parameter gradually reduces in value when the control effort increases from the lowest limit and continues to reduce until the control effort reaches a highest limit, and
   wherein the third control parameter reduces more gradually than the second parameter in value when the control effort increases from the lowest limit, and abruptly reduces in value as the control effort increases beyond a second threshold that is greater than the first threshold.

21. The article of manufacture of claim 20, wherein instructions to retrieve the values of control parameters from the lookup table further comprise instructions that when executed by the processor, cause the processor to:
   obtain, from the lookup table, a fourth value of a fourth control parameter, respectively, based on the calculated control effort value
   wherein the fourth control parameter controls a full-band gain of the audio signal,
   wherein the fourth control parameter either remains flat or reduces very gradually in value as the control effort increases from the lowest limit, and abruptly reduces in value as the control effort increases beyond a third threshold that is greater than the second threshold, the third threshold indicating the first loudspeaker cabinet is operating in a compromised situation.

22. The article of manufacture of claim 21, wherein the first frequency band is a low frequency band, the second frequency band is a middle frequency band, the third frequency band is a high frequency band, and the full-band gain is an overall volume of the audio signal.

23. The article of manufacture of claim 20, wherein instructions to adjust the audio signal according to the generated values of the control parameters comprise instructions that when executed by the processor, cause the processor to:
   adjust gain in each of a plurality of frequency bands of the audio signal, according to the generated values of the control parameters.

24. The article of manufacture of claim 18, wherein the non-transitory machine readable medium includes further instructions, which when executed by the processor, cause the processor to:
   receive a further value of control effort from a second loudspeaker cabinet;
   determine whether the calculated control effort value for the first loudspeaker cabinet is higher than the further control effort value for the second loudspeaker cabinet;
   wirelessly transmit the higher of (i) the calculated control effort value and (ii) the further control effort value, to the second loudspeaker cabinet; and
   wherein instructions to generate the plurality of values of control parameters comprise instructions that when executed by the processor, cause the processor to
      retrieve the plurality values of control parameters from the lookup table using the higher of (i) the calculated control effort value for the first loudspeaker cabinet and (ii) the further control effort value for the second loudspeaker cabinet, as the index to the lookup table.

* * * * *